(12) United States Patent
Peryea et al.

(10) Patent No.: US 10,196,151 B2
(45) Date of Patent: Feb. 5, 2019

(54) ROTORCRAFT FUEL SYSTEM HAVING ENHANCED CRASH RESISTANCE

(71) Applicant: Bell Helicopter Textron Inc., Fort Worth, TX (US)

(72) Inventors: Martin Peryea, Fort Worth, TX (US); Michael Reaugh Smith, Fort Worth, TX (US); Douglas Hamelwright, Jr., Fort Worth, TX (US); Albert G. Brand, Fort Worth, TX (US); Nicholas J. Plagianos, Fort Worth, TX (US); Joshua Emrich, Fort Worth, TX (US); Timothy Carr, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 299 days.

(21) Appl. No.: 15/144,179

(22) Filed: May 2, 2016

(65) Prior Publication Data

US 2017/0313434 A1    Nov. 2, 2017

(51) Int. Cl.
| | |
|---|---|
| *B64D 37/06* | (2006.01) |
| *B64D 37/32* | (2006.01) |
| *B64C 27/00* | (2006.01) |
| *B64D 37/04* | (2006.01) |
| *B64C 27/04* | (2006.01) |

(52) U.S. Cl.
CPC .............. *B64D 37/06* (2013.01); *B64C 27/00* (2013.01); *B64D 37/04* (2013.01); *B64D 37/32* (2013.01); *B64C 27/04* (2013.01)

(58) Field of Classification Search
CPC ........ B64D 37/06; B64D 37/04; B64D 37/02; B64D 2041/005
See application file for complete search history.

(56) References Cited

U.S. PATENT DOCUMENTS

| | | | | |
|---|---|---|---|---|
| 3,288,186 | A | * | 11/1966 | Headrick ............... B64D 37/08 220/563 |
| 4,214,721 | A | | 7/1980 | Burhans et al. |
| 5,451,015 | A | | 9/1995 | Cronkhite et al. |
| 6,019,316 | A | | 2/2000 | Sarlin et al. |
| 7,909,288 | B2 | | 3/2011 | Anghileri |
| 9,086,016 | B2 | | 7/2015 | Mast et al. |
| 9,145,277 | B2 | | 9/2015 | Kendrick et al. |

(Continued)

FOREIGN PATENT DOCUMENTS

| | | | | |
|---|---|---|---|---|
| GB | 590896 | A * | 7/1947 | ............ B60P 3/2205 |
| KR | 20030055598 | A | 7/2003 | |

OTHER PUBLICATIONS

European Search Report, Application No. 16172307.7, dated Jun. 30, 2017.

*Primary Examiner* — Jessica B Wong
(74) *Attorney, Agent, or Firm* — Lawrence Youst PLLC (57) ABSTRACT

A rotorcraft includes a fuselage having a fuel tank receiving assembly with a fuel tank positioned therein. The fuel tank including a plurality of interconnected fuel bags operable to contain liquid fuel. A network of straps is disposed about the fuel tank forming a restraint assembly. The network of straps includes at least one perimeter strap extending at least partially about at least two fuel bags and at least one surrounding strap extending at least partially about the at least two fuel bags. The at least one perimeter strap has at least two intersections with the at least one surrounding strap.

17 Claims, 7 Drawing Sheets

(56) References Cited

U.S. PATENT DOCUMENTS

2013/0214095 A1     8/2013   Bofill
2015/0102040 A1*    4/2015   Bornes ................... B64D 37/06
                                                        220/562
2015/0307178 A1*   10/2015   Fink ........................ B64C 1/061
                                                        244/119

* cited by examiner

ROTORCRAFT FUEL SYSTEM HAVING ENHANCED CRASH RESISTANCE

TECHNICAL FIELD OF THE DISCLOSURE

The present disclosure relates, in general, to a rotorcraft fuel system having enhanced crash resistance and, in particular, to a rotorcraft fuel system having a network of straps that form a restraint assembly about the fuel tank to minimize excessive motion of the interconnected fuel bags following crash impact.

BACKGROUND

Among other responsibilities, the United States Federal Aviation Federation (FAA) established airworthiness standards for aircraft such as airplanes and rotorcraft and provides airworthiness approval for aircraft, aircraft engines, propellers and related articles which certifies that they conform to an approved design and are in a condition for safe operation. More specifically, part 29 of the FAA regulations is directed to airworthiness standards for transport rotorcraft, which includes section 29.952 that is directed to fuel system crash resistance. This section details design features for fuel systems intended to minimize the hazard of fuel fires to occupants following an otherwise survivable impact such as a crash landing. In addition, this section states that fuel systems must be shown to be capable of sustaining certain static and dynamic deceleration loads, considered as ultimate loads acting alone, measured at the system component's center of gravity without structural damage to the system components, fuel tanks or their attachments that could leak fuel to an ignition source.

One of the requirements for obtaining rotorcraft fuel system airworthiness approval is the successful completion of a drop test. The drop test requirements include: (1) the drop height must be at least 50 feet; (2) the drop impact surface must be nondeforming; (3) the fuel tanks must be filled with water to 80 percent of the normal, full capacity or fuel to the full capacity; (4) the fuel tank must be enclosed in a surrounding structure representative of the installation unless it can be established that the surrounding structure is free of projections or other design features likely to contribute to rupture of the tank; (5) the fuel tank must drop freely and impact in a horizontal position +/−10 degrees; and (6) after the drop test, there must be no leakage.

SUMMARY

In one aspect, the present disclosure is directed to a rotorcraft fuel system. The rotorcraft fuel system includes a fuel tank having a plurality of interconnected fuel bags operable to contain liquid fuel and a network of straps disposed about the fuel tank forming a restraint assembly. The network of straps includes at least one perimeter strap extending at least partially about at least two fuel bags and at least one surrounding strap extending at least partially about the at least two fuel bags such that the at least one perimeter strap and the at least one surrounding strap have at least two intersections. It is noted that the fuel tank is surrounded by airframe structure that is sized to carry all flight and landing loads, but not the 50-foot drop that results in a 56.7 foot/second impact. Instead of designing the airframe structure to support this impact, the present disclosure teaches a much more weight effective approach using the network of straps to form the restraint assembly that maintains the integrity of the interconnected fuel system during the impact. Further, the presence of the network of straps keeps the plurality of interconnected fuel bags proximate to each other throughout the impact sequence precluding the need for self-sealing breakaway fittings, which decreases the operational risk as self-sealing fittings are susceptible to cause an inflight inadvertent blockage of fuel flow.

In some embodiments, the at least one perimeter strap extends at least partially about at least four fuel bags. Certain embodiments include a plurality of surrounding straps such as one or more laterally extending surrounding straps, one or more longitudinally extending surrounding straps or combinations thereof. In some embodiments, the at least one perimeter strap and the at least one surrounding strap move independent of each other at the intersections thereof. In other embodiments, the at least one perimeter strap and the at least one surrounding strap are coupled to each other at the intersections thereof. In some embodiments, the network of straps moves independent of the fuel bags. In other embodiments, the network of straps is selectively coupled to the fuel bags.

In certain embodiments, the network of straps includes one or more end cap straps that are coupled to an upper section and a lower section of the at least one surrounding strap and extend therebetween around an end portion of a fuel bag. In some embodiments, the network of straps includes one or more single fuel bag perimeter straps extending at least partially about a fuel bag. In certain embodiments, first and second ends of the at least one perimeter strap are coupled together. In other embodiments, the at least one perimeter strap is coupled to a fuel tank receiving assembly of the rotorcraft. In some embodiments, first and second ends of the at least one surrounding strap are coupled together. In other embodiments, the at least one surrounding strap is coupled to the fuel tank receiving assembly of the rotorcraft. In certain embodiments, the network of straps may include energy absorbing elements.

In another aspect, the present disclosure is directed to a rotorcraft. The rotorcraft includes a fuselage having a fuel tank receiving assembly with a fuel tank positioned therein. The fuel tank includes a plurality of interconnected fuel bags operable to contain liquid fuel. A network of straps is disposed about the fuel tank forming a restraint assembly. The network of straps includes at least one perimeter strap extending at least partially about at least two fuel bags and at least one surrounding strap extending at least partially about the at least two fuel bags. The at least one perimeter strap has at least two intersections with the at least one surrounding strap.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
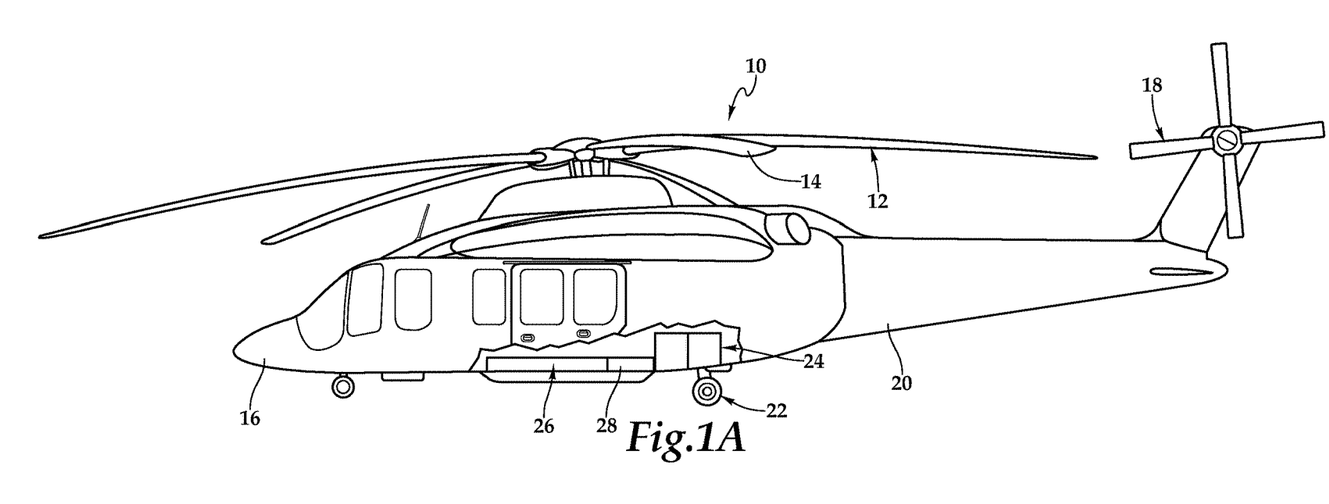
FIGS. 1A-1B are schematic illustrations of an exemplary rotorcraft in accordance with embodiments of the present disclosure depicted in a side view with a partial cut away and a front view, respectively.
Figure 1B:
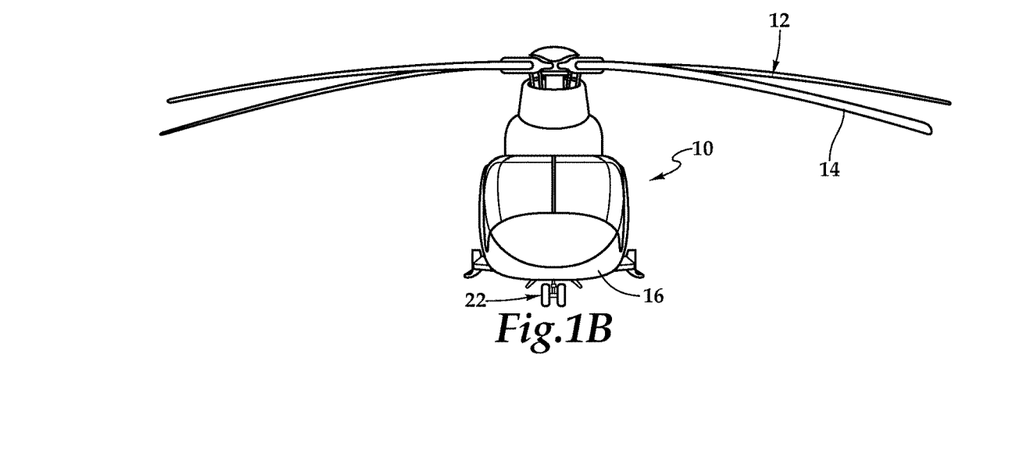

Referring now to FIGS. 1A-1B in the drawings, a rotorcraft 10 is schematically illustrated. Rotorcraft 10 has a rotor system 12 with a plurality of rotor blades 14. The pitch of rotor blades 14 can be collectively and cyclically manipulated to selectively control direction, thrust and lift of rotorcraft 10. Rotorcraft 10 includes a fuselage 16, an anti-torque system 18 and an empennage 20. Rotorcraft 10 has a landing gear system 22 to provide ground support for the aircraft. Located in a lower portion of fuselage 16, rotorcraft 10 includes a fuel tank receiving assembly 24 that supports and contains a fuel system 26 including a fuel tank 28. Liquid fuel is contained within fuel tank 28 that is used as an energy source to power one or more engines that drive rotor system 12 and anti-torque system 18. It should be appreciated that rotorcraft 10 is merely illustrative of a variety of aircraft that can implement the embodiments disclosed herein. Other aircraft implementations can include hybrid aircraft, tilt rotor aircraft, unmanned aircraft, gyrocopters and a variety of helicopter configurations, to name a few examples. It should be appreciated that even though aircraft are particularly well suited to implement the embodiments of the present disclosure, non-aircraft vehicles and devices can also implement the embodiments.

Figure 2:
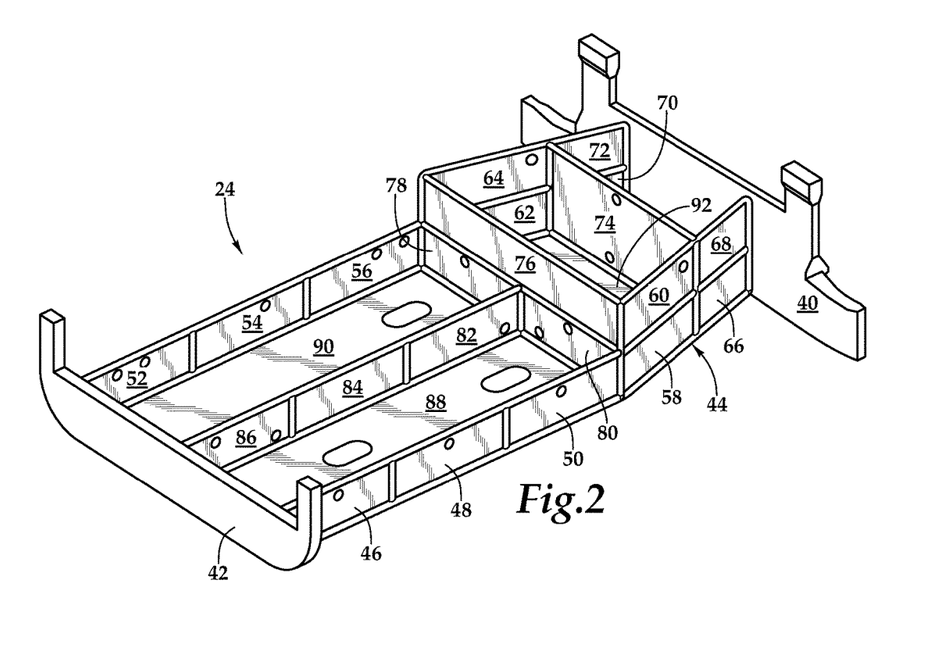
FIG. 2 is an isometric view of a fuel tank receiving assembly for use with a rotorcraft fuel system in accordance with embodiments of the present disclosure.

Referring now to FIG. 2 in the drawings, a fuel tank receiving assembly 24 is illustrated. Fuel tank receiving assembly 24 may be fully or partially integral with fuselage 16 of rotorcraft 10 or may be independent of but secured to fuselage 16 of rotorcraft 10. In the illustrated embodiment, rotorcraft bulkhead 40 forms an aft portion of fuel tank receiving assembly 24 and rotorcraft bulkhead 42 forms a forward portion of fuel tank receiving assembly 24. Rotorcraft bulkhead 40 and rotorcraft bulkhead 42 may be formed from a metal such as aluminum, composite or other suitable material. Fuel tank receiving assembly 24 includes a frame structure 44 that may be a unitary frame structure or may be formed from a plurality of frame elements, as depicted in FIG. 2. Frame structure 44 may be formed from a metal such as aluminum, polymer, composite or other suitable material. Frame structure 44 supports a plurality of a panel members including side panel members 46, 48, 50, 52, 54, 56 of a forward portion of fuel tank receiving assembly 24, side panel members 58, 60, 62, 64 of a mid portion of fuel tank receiving assembly 24 and side panel members 66, 68, 70, 72 of an aft portion of fuel tank receiving assembly 24. Frame structure 44 also supports lateral panel 74 between the mid and aft portions of fuel tank receiving assembly 24 and panels 76, 78, 80 between the forward and mid portions of fuel tank receiving assembly 24. Frame structure 44 further supports longitudinal panels 82, 84, 86 between right and left sections of the forward portion of fuel tank receiving assembly 24.

Frame structure 44 supports lower panel 88 and lower panel 90 in the forward portion of fuel tank receiving assembly 24, lower panel 92 in the mid portion of fuel tank receiving assembly 24 and a lower panel (not visible) in the aft portion of fuel tank receiving assembly 24. The various panels may be formed from a metal such as aluminum, polymer, composite or other suitable material and may be attached to, coupled to or integral with frame structure 44. The various panels include openings to allow fluid lines or other systems to pass through one or more panels or entirely through fuel tank receiving assembly 24. Even though fuel tank receiving assembly 24 has been described as having frame and panel construction, it should be understood by those skilled in the art that fuel tank receiving assembly 24 could be constructed in any number of different manners including, but not limited to, as a single unitary assembly, as multiple unitary subassemblies such as a front subassembly, a mid subassembly and an aft subassembly, or in another suitable manner. Likewise, portions of fuel tank receiving assembly 24 could alternatively be formed by sections of keel beams connected to or integral with fuselage 16 of rotorcraft 10 such as a pair of side keel beams and a central keel beam each of which extends in the longitudinal direction of fuel tank receiving assembly 24. Regardless of the specific manner of construction, important features of fuel tank receiving assembly 24 include being sized and shaped to operably receive and contain fuel tank 28 therein.

Figure 3:
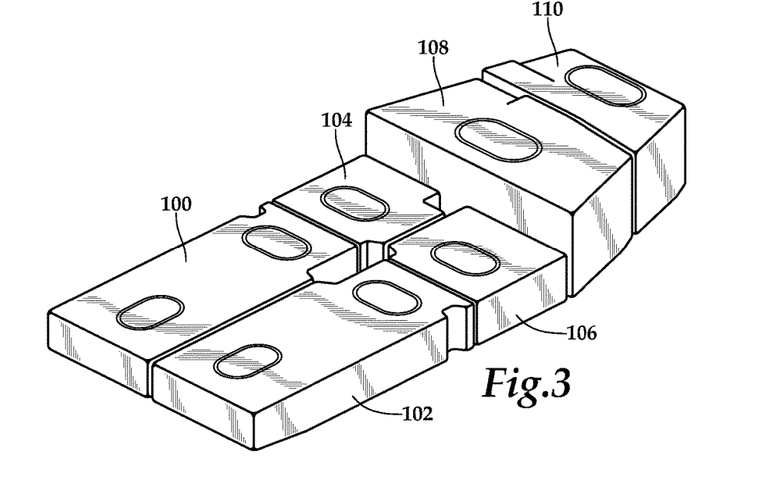
FIG. 3 is an isometric view of a fuel tank for use with a rotorcraft fuel system in accordance with embodiments of the present disclosure.

Referring now to FIG. 3 in the drawings, a fuel tank 28 is illustrated. In the illustrated embodiment, fuel tank 28 is depicted as having six interconnected fuel bags including forward bags 100, 102, feed bags 104, 106, mid bag 108 and aft bag 110. Also, as illustrated, the height of mid bag 108 and aft bag 110 is greater than that of forward bags 100, 102 and feed bags 104, 106. The volume of fuel that may be stored in fuel tank 28 will depend on the particular implementation but will typically be on the order of several hundred to a thousand gallons. Even though fuel tank 28 has been described as having a particular number of fuel bags in a particular configuration, it should be understood by those skilled in the art that fuel tank 28 could have any number of fuel bags both less than or greater than six and the fuel bags could be arranged in any manner of different configurations depending upon the particular implementation.

Figure 4:
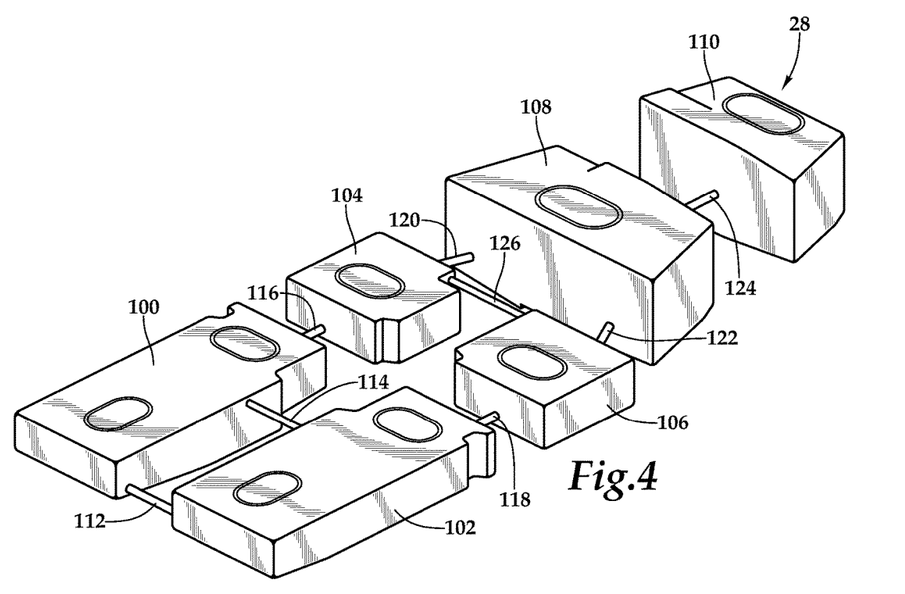
FIG. 4 is an exploded view of a fuel tank for use with a rotorcraft fuel system in accordance with embodiments of the present disclosure.

Referring now to FIG. 4 in the drawings, a fuel tank 28 is illustrated in an exploded view. In the illustrated embodiment, fuel tank 28 including forward bags 100, 102, feed bags 104, 106, mid bag 108 and aft bag 110. As illustrated, two fluid interconnection lines 112, 114 establish fluid communication between forward bags 100, 102. Preferably, fluid interconnection line 112 is operable to communicate a liquid, such as fuel between forward bags 100, 102 while fluid interconnection lines 114 is a vent line operable to communicate a gas, such as air between forward bags 100, 102. Also illustrated is a fluid interconnection line 116 that establishes fluid communication between forward bag 100 and feed bag 104, a fluid interconnection line 118 that establishes fluid communication between forward bag 102 and feed bag 106, a fluid interconnection line 120 that establishes fluid communication between feed bag 104 and mid bag 108, a fluid interconnection line 122 that establishes fluid communication between feed bag 106 and mid bag 108, a fluid interconnection line 124 that establishes fluid communication between mid bag 108 and aft bag 110 and a fluid interconnection line 126 that establishes fluid communication between feed bag 104 and feed bag 106. Fluid interconnection lines 116, 118, 120, 122, 124 are preferably operable to communicate liquids while fluid interconnection line 126 is preferably a vent line operable to communicate a gas. Importantly, during a crash impact of a rotorcraft including fuel tank 28, none of the fluid interconnection lines can become severed or separated from a fuel bag as this could result in fuel exiting the fuel tank and potentially igniting.

Figure 5:
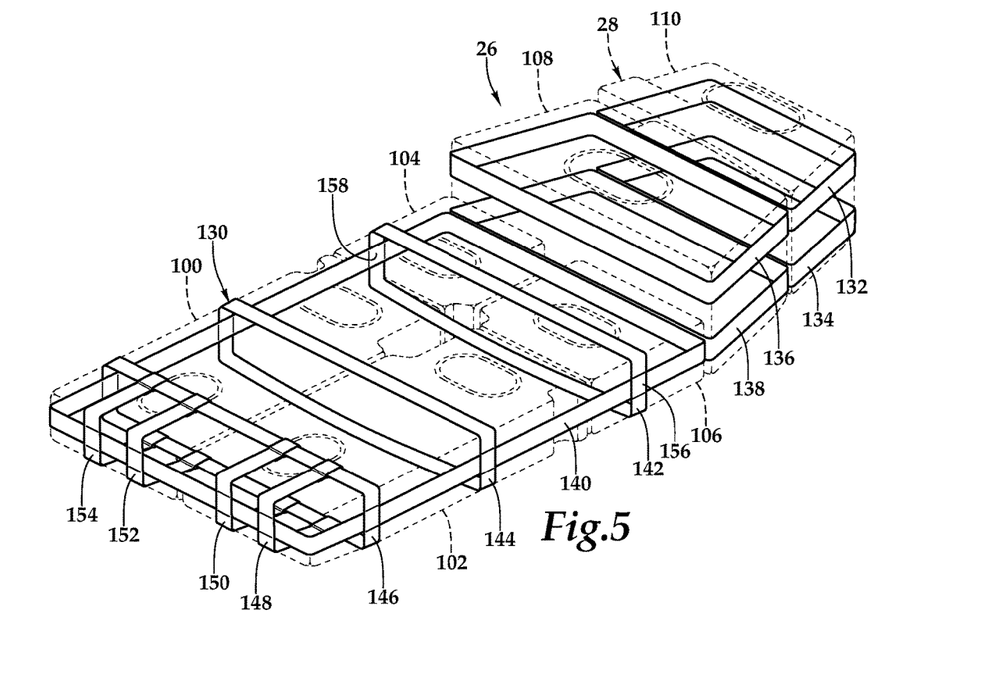
FIG. 5 is an isometric view of a rotorcraft fuel system in accordance with embodiments of the present disclosure.

Referring now to FIG. 5 in the drawings, a rotorcraft fuel system 26 is illustrated. In the illustrated embodiment, fuel tank 28 is depicted as having six interconnected fuel bags including forward bags 100, 102, feed bags 104, 106, mid bag 108 and aft bag 110. A network of straps depicted as restraint assembly 130 is disposed about fuel tank 28 to minimize excessive motion and maintain integrity of the interconnected fuel bags following a crash impact which mitigates extension and/or separation of the fluid interconnection lines and reduces the potential of a fuel bag being punctured. Restraint assembly 130 including a plurality of perimeter straps and a plurality of surrounding straps that form a fuel tank containment system. The network of straps are preferably light weight, have high tensile strength and high modulus of elasticity (low elongation) and are fuel tolerant such as Kevlar straps, Vectran straps, polyester/nylon straps, aluminum straps or the like. As illustrated, restraint assembly 130 includes upper and lower aft fuel bag perimeter straps 132, 134, each of which extends continuously about the perimeter of aft bag 110. Restraint assembly 130 also includes upper and lower mid fuel bag perimeter straps 136, 138, each of which extends continuously about the perimeter of mid bag 108. Restraint assembly 130 further includes a forward and feed fuel bag perimeter strap 140 that extends continuously about the perimeter of forward bags 100, 102 and feed bags 104, 106, a feed fuel bag surrounding strap 142 that extends continuously around feed bags 104, 106 in the lateral direction, and a pair of forward fuel bag surrounding straps 144, 146 each of which extends continuously around forward bags 100, 102 in the lateral direction. In addition, restraint assembly 130 includes four end cap straps 148, 150, 152, 154 that are coupled to an upper section and a lower section of forward fuel bag surrounding strap 146 such that end cap straps 148, 150, 152, 154 extend partially about forward bags 100, 102. Preferably, the end sections of end cap straps 148, 150, 152, 154 include loops through which forward fuel bag surrounding strap 146 may pass to couple forward fuel bag surrounding strap 146 with end cap straps 148, 150, 152, 154.

With the exception of end cap straps 148, 150, 152, 154, each of the straps of restraint assembly 130 may be coupled to itself using a suitable end or surface connection systems such as buckles, hooks, ratchets, hook and loop connections or the like. Depending upon the particular implementation, the network of straps of restraint assembly 130 may be operable to move independent of the fuel bags or may be selectively coupled to the fuel bags using a suitable connection system such as pass through loops on the fuel bags, hook and loop connections or the like. In the illustrated embodiment, upper and lower aft fuel bag perimeter straps 132, 134 are operable to move independently from upper and lower mid fuel bag perimeter straps 136, 138. Likewise, lower mid fuel bag perimeter strap 138 is operably to move independently from forward and feed fuel bag perimeter strap 140.

With the exception of end cap straps 148, 150, 152, 154, each of the straps of restraint assembly 130 disposed about forward bags 100, 102 and feed bags 104, 106 may be operable to move independent of one another. Alternatively, some or all of the straps may be coupled to one another at the various intersections thereof using a suitable connection system such as pass through loops, hook and loop connections, stitching or the like. For example, forward and feed fuel bag perimeter strap 140 has two intersections 156, 158 with feed fuel bag surrounding strap 142. Depending on the type of connection at intersections 156, 158, forward and feed fuel bag perimeter strap 140 and feed fuel bag surrounding strap 142 may be allowed omnidirectional relative movement if no connection is present, bidirectional relative movement if pass through loop connections are present or substantially restricted relative movement if hook and loop or stitching connections are present.

It should be understood by those skilled in the art that the particular implementation of a rotorcraft fuel system for minimizing excessive motion and maintaining integrity of the interconnected fuel bags following a crash impact will determine the preferred interrelationship between the network of straps and the fuel tank as well as the preferred interrelationship between the straps within the network. In addition, it should be understood by those skilled in the art that the particular configuration of the network of straps disposed about a fuel tank can take many specific forms depending upon the specific fuel tank implementation including a greater or lesser number of perimeter straps, a greater or lesser number of surrounding straps, perimeter straps and/or surrounding straps that extend only partially about one or more fuel bags, surrounding straps that extending in directions other than the lateral direction or the longitudinal direction such as in diagonal directions and the like.

Figure 6:
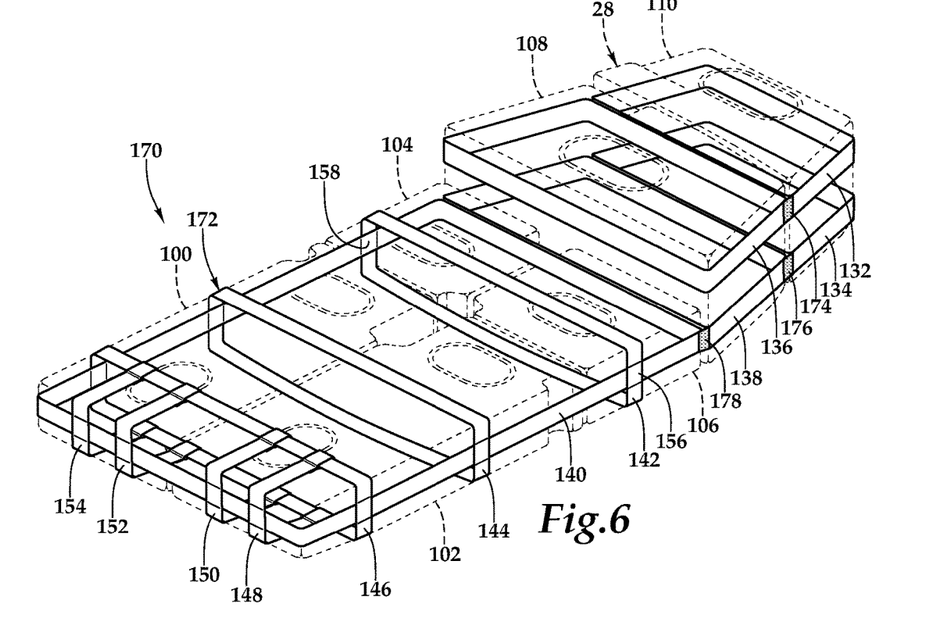
FIG. 6 is an isometric view of a rotorcraft fuel system in accordance with embodiments of the present disclosure.

For example, as best seen in FIG. 6, a rotorcraft fuel system 170 is illustrated wherein restraint assembly 172 includes upper and lower aft fuel bag perimeter straps 132, 134, upper and lower mid fuel bag perimeter straps 136, 138, forward and feed fuel bag perimeter strap 140, feed fuel bag surrounding strap 142, forward fuel bag surrounding straps 144, 146, and end cap straps 148, 150, 152, 154. In this implementation, restraint assembly 172 includes a plurality of additional connections to further stabilize the interconnected fuel bags following a crash impact. Specifically, in the illustrated embodiment, upper aft fuel bag perimeter strap 132 is coupled to upper mid fuel bag perimeter strap 136 at one or more connections 174 using, for example, hook and loop connections, stitching connections, bracket member connections or other suitable mechanical connections that may extend laterally along some or all of the interface between upper aft fuel bag perimeter strap 132 and upper mid fuel bag perimeter strap 136 or may have distinct point connections at, for example, the corner sections of upper aft fuel bag perimeter strap 132 and upper mid fuel bag perimeter strap 136. Likewise, lower aft fuel bag perimeter strap 134 is coupled to lower mid fuel bag perimeter strap 138 at one or more connections 176 and lower mid fuel bag perimeter strap 138 is coupled to forward and feed fuel bag perimeter strap 140 at one or more connections 178.

Figure 7:
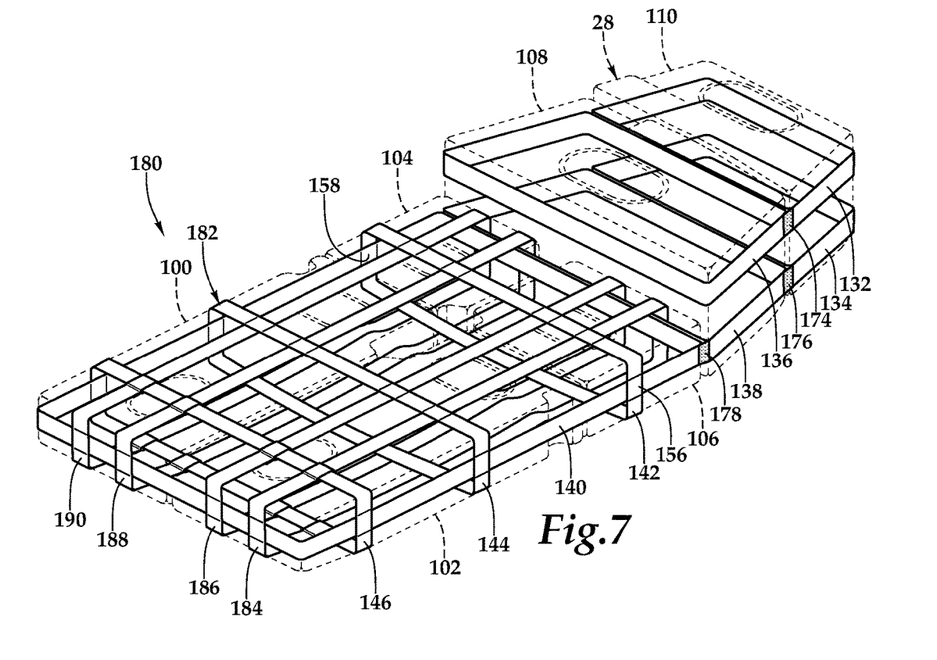
FIG. 7 is an isometric view of a rotorcraft fuel system in accordance with embodiments of the present disclosure.

As another example, as best seen in FIG. 7, a rotorcraft fuel system 180 is illustrated wherein fuel tank 28 has a network of straps depicted as restraint assembly 182 disposed thereabout. Fuel tank 28 includes forward bags 100, 102, feed bags 104, 106, mid bag 108 and aft bag 110. Restraint assembly 182 includes upper and lower aft fuel bag perimeter straps 132, 134, upper and lower mid fuel bag perimeter straps 136, 138, forward and feed fuel bag perimeter strap 140, feed fuel bag surrounding strap 142, and forward fuel bag surrounding straps 144, 146. Instead of having end cap straps as described above, restraint assembly 182 includes a pair of surrounding straps 184, 186 that extends continuously around forward bag 102 and feed bag 106 in the longitudinal direction and a pair of surrounding straps 188, 190 that extends continuously around forward bag 100 and feed bag 104 in the longitudinal direction. Surrounding straps 184, 186, 188, 190 may have omnidirectional relative movement, bidirectional relative movement or substantially restricted relative movement at their various intersections with the other straps depending upon the selected implementation. Each of surrounding straps 184, 186, 188, 190 may be coupled to itself using a suitable end or surface connection systems such as buckles, hooks, ratchets, hook and loop connections or the like. As illustrated, upper aft fuel bag perimeter strap 132 is coupled to upper mid fuel bag perimeter strap 136 at one or more connections 174, lower aft fuel bag perimeter strap 134 is coupled to lower mid fuel bag perimeter strap 138 at one or more connections 176 and lower mid fuel bag perimeter strap 138 is coupled to forward and feed fuel bag perimeter strap 140 at one or more connections 178.

Figure 8:
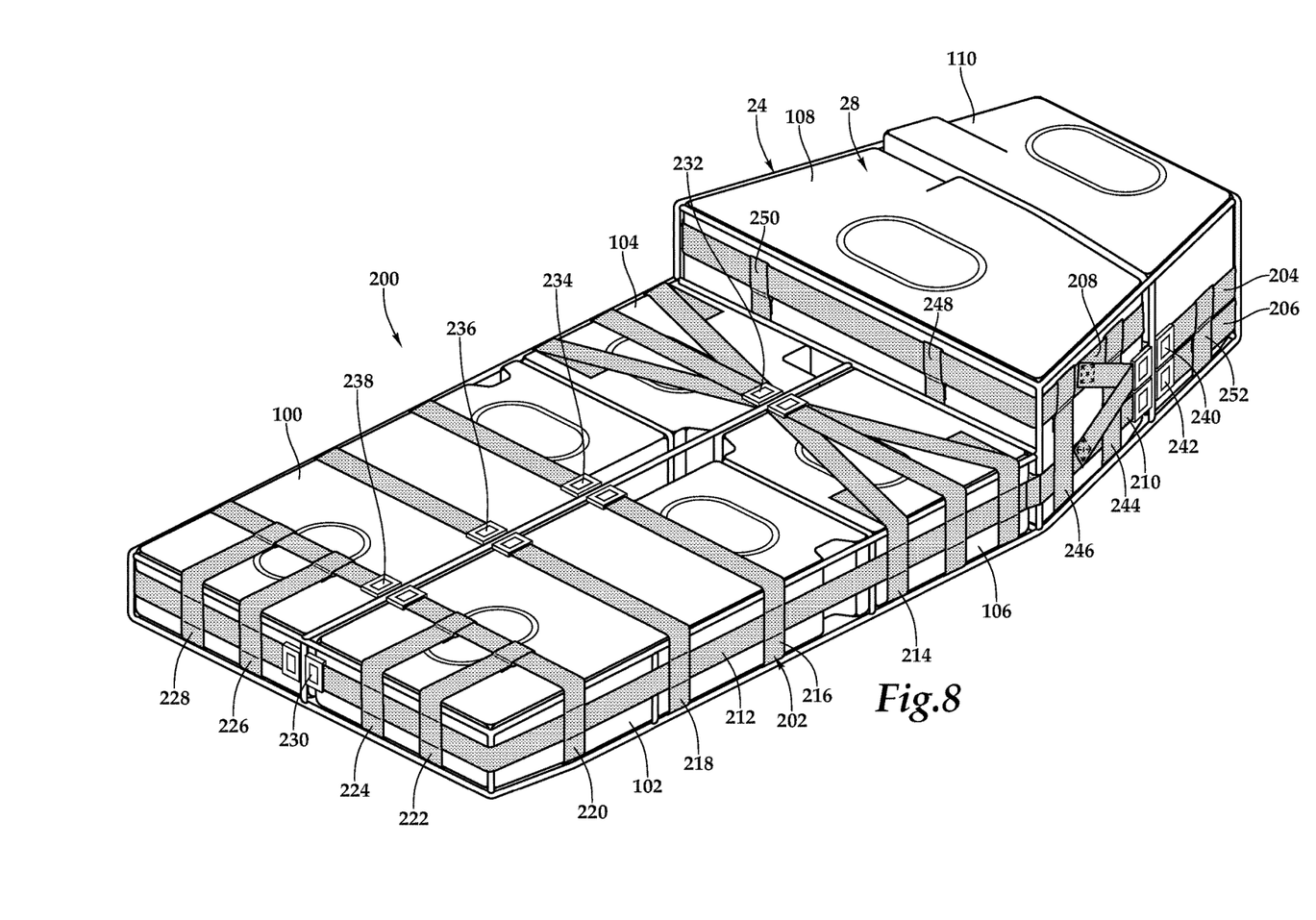
FIG. 8 is an isometric view of a rotorcraft fuel system in accordance with embodiments of the present disclosure.

Referring now to FIG. 8 in the drawings, a rotorcraft fuel system 200 positioned within a fuel tank receiving assembly 24 is illustrated. Fuel tank 28 includes forward bags 100, 102, feed bags 104, 106, mid bag 108 and aft bag 110. A network of straps depicted as restraint assembly 202 is disposed about fuel tank 28. Restraint assembly 202 includes upper and lower aft fuel bag perimeter straps 204, 206, upper and lower mid fuel bag perimeter straps 208, 210, forward and feed fuel bag perimeter strap 212, feed fuel bag surrounding strap assembly 214, forward fuel bag surrounding straps 216, 218, 220 and end cap straps 222, 224, 226, 228. In the illustrated embodiment, feed fuel bag surrounding strap assembly 214 includes a multi-strap system having both laterally and diagonally extending strap members to further minimize excessive motion of feed bags 104, 106, which, in the illustrated fuel tank configuration, tend to experience the greatest stresses during crash impact. Restraint assembly 202 also includes a pair of mid fuel bag surrounding straps 244, 246 that extend partially about mid bag 108 in the lateral direction between right and left sides of upper mid fuel bag perimeter strap 208, a pair of mid fuel bag surrounding straps 248, 250 that extend partially about mid bag 108 in the longitudinal direction between forward and aft portions of upper mid fuel bag perimeter strap 208, an aft fuel bag surrounding strap 252 that extends partially about aft bag 110 in the lateral direction between right and left sides of upper aft fuel bag perimeter strap 204 and one or more aft fuel bag surrounding straps (not visible) that extend partially about aft bag 110 in the longitudinal direction between forward and aft portions of upper aft fuel bag perimeter strap 204.

In the illustrated embodiment, restraint assembly 202 is selectively coupled to fuel tank receiving assembly 24. Note that the panels of fuel tank receiving assembly 24 have been removed such that only frame assembly 44 of fuel tank receiving assembly 24 is shown for clarity in the illustration. As illustrated, various straps of restraint assembly 202 are coupled to frame elements of frame assembly 44. For example, forward and feed fuel bag perimeter strap 212 is coupled to frame assembly 44 at frame connection 230, feed fuel bag surrounding strap assembly 214 is coupled to frame assembly 44 at frame connection 232 and forward fuel bag surrounding straps 216, 218, 220 are coupled to frame assembly 44 at frame connections 234, 236, 238, respectively. In addition, upper and lower aft fuel bag perimeter straps 204, 206 are coupled to frame assembly 44 at frame connections 240, 242, respectively. The various connections between restraint assembly 202 and fuel tank receiving assembly 24 are designed to further minimize excessive motion and maintain integrity of the interconnected fuel bags during crash impact. The specific locations of such connections will be determined based upon the particular implementation of the rotorcraft fuel system and the fuel tank receiving assembly. Even though FIG. 8 has depicted straps coupled to the frame assembly via frame connections in the form of buckles, it should be understood by those skilled in the art that the straps could be coupled to the frame assembly using a variety of different types of frame connections including hooks, fittings, fasteners, bolts, hook and loop connections or other suitable mechanical connections.

Figure 9:
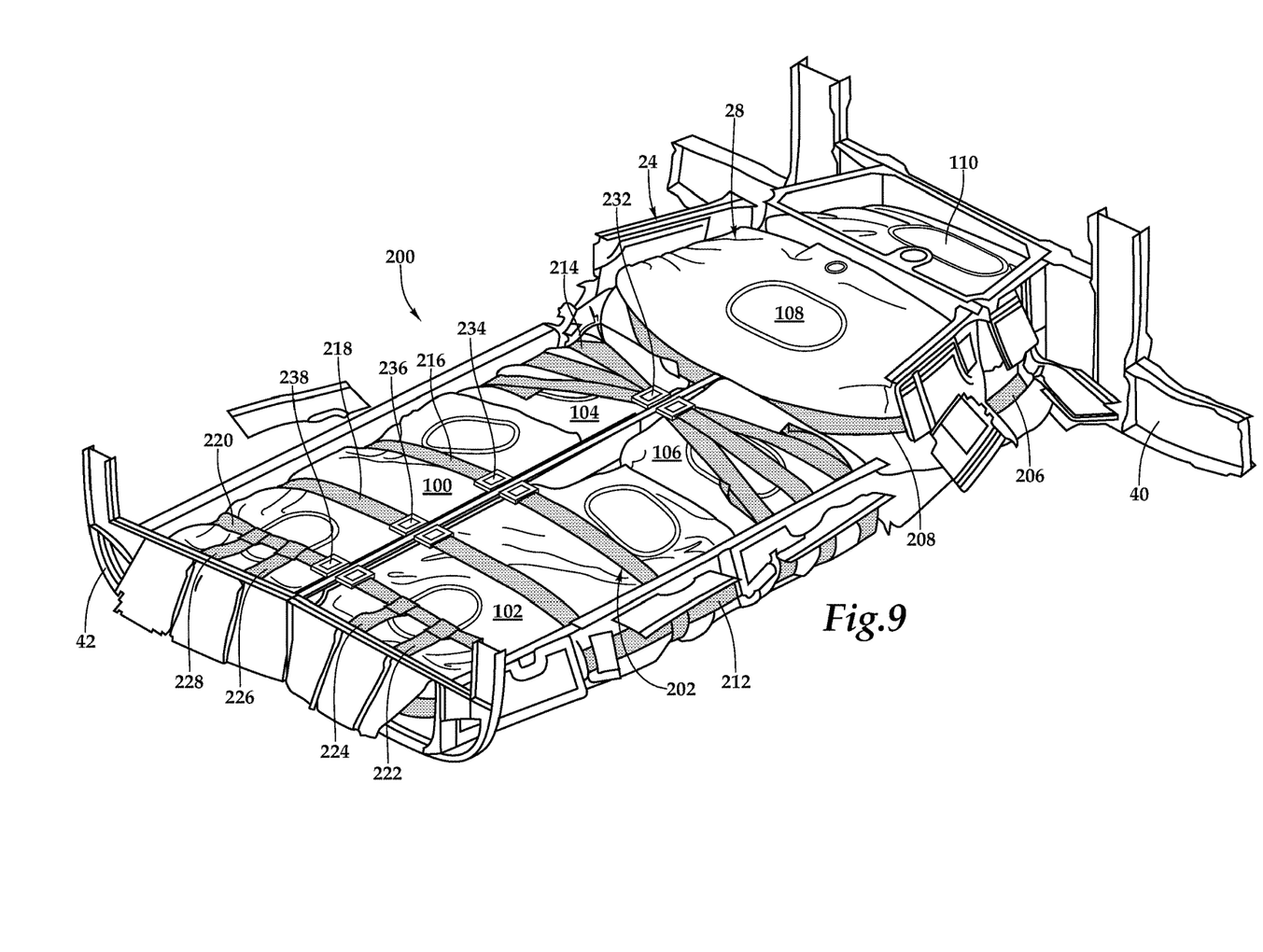
FIG. 9 is an isometric view of a rotorcraft fuel system in accordance with embodiments of the present disclosure positioned in a fuel tank receiving assembly following a simulated crash impact.

Referring now to FIG. 9 in the drawings, a rotorcraft fuel system 200 positioned within a fuel tank receiving assembly 24 is illustrated following a simulated drop test consistent with the requirements of section 29.952 of the FAA regulations directed to fuel system crash resistance. Fuel tank 28 includes forward bags 100, 102, feed bags 104, 106, mid bag 108 and aft bag 110. A network of straps depicted as restraint assembly 202 is disposed about fuel tank 28 including upper aft fuel bag perimeter strap (not visible), lower aft fuel bag perimeter strap 206, upper mid fuel bag perimeter strap 208, lower mid fuel bag perimeter strap (not visible), forward and feed fuel bag perimeter strap 212, feed fuel bag surrounding strap assembly 214, forward fuel bag surrounding straps 216, 218, 220 and end cap straps 222, 224, 226, 228. In addition, restraint assembly 202 was selectively coupled to fuel tank receiving assembly 24 as described above with reference to FIG. 8 including frame connections 232, 234, 236, 238. As illustrated, fuel tank receiving assembly 24 including bulkheads 40, 42 have sustained significant damage to, for example, certain frame elements and certain panels, which may now pose a puncture threat and/or tear hazard to the fuel bags of fuel tank 28.

Importantly, restraint assembly 202 has provided the required support about fuel tank 28 to prevent excessive motion of the interconnected fuel bags that may be caused by outward momentum of the fuel mass that tends to propel the fuel bags away from one another during and following a crash impact. By minimizing excessive motion of the fuel bags, restraint assembly 202 is operable to prevent extension and/or rupture of the fluid interconnection lines and to minimize the risk of the fuel bags becoming punctured by puncture threats, thereby maintaining integrity and preventing the fuel bags from leaking fluid during and following a crash impact, which minimizes post-crash conflagration risk. In addition, restraint assembly 202 has provided added puncture protection by providing an additional material barrier around the fuel bags at the locations of the network of straps, which further minimizes the risk of the fuel bags leaking fluid during and following a crash impact.

Figure 10:
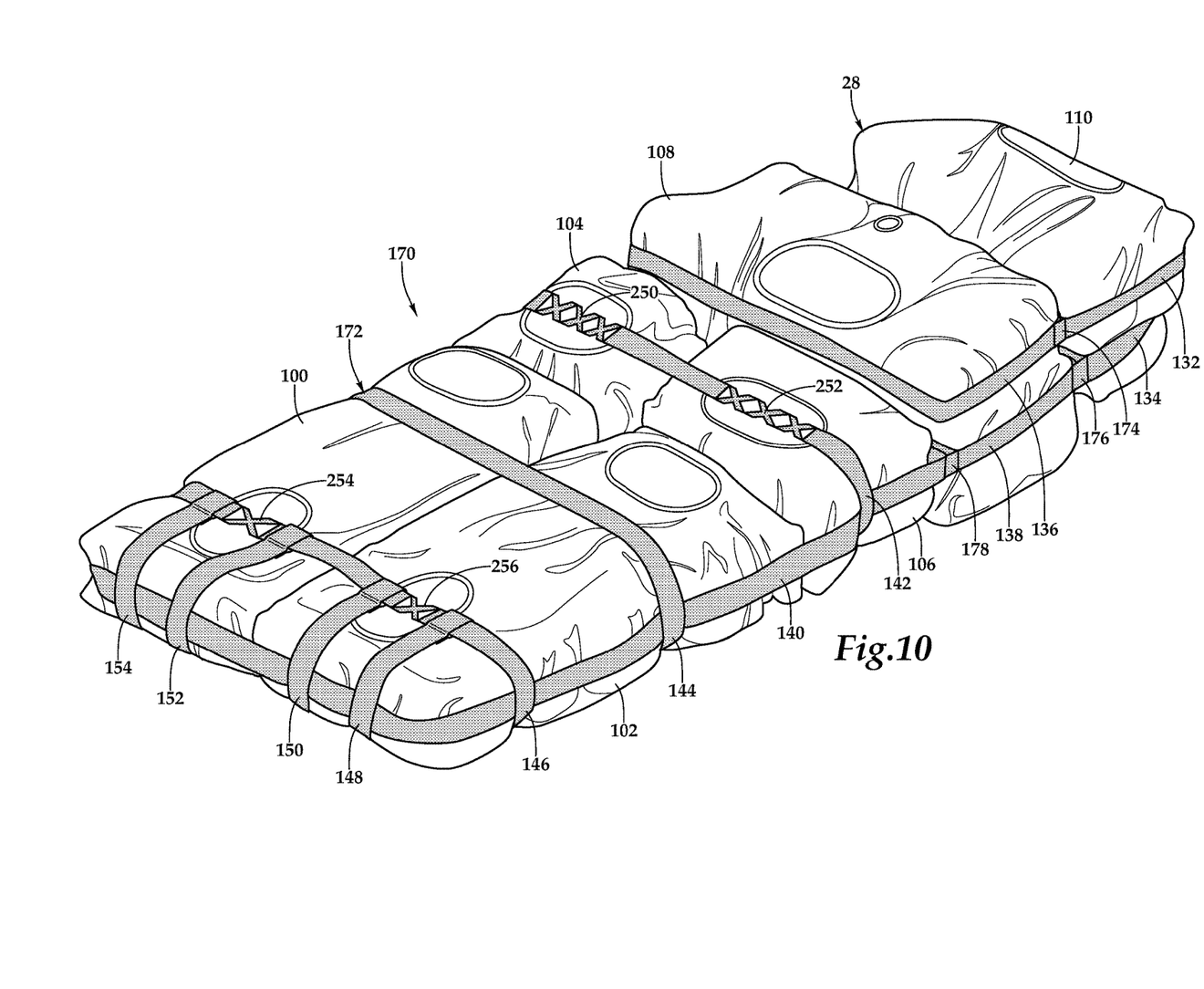
FIG. 10 is an isometric view of a rotorcraft fuel system in accordance with embodiments of the present disclosure following a simulated crash impact.

Referring now to FIG. 10 in the drawings, a rotorcraft fuel system 170 is illustrated that has been removed from a fuel tank receiving assembly following a simulated drop test consistent with the requirements of section 29.952 of the FAA regulations directed to fuel system crash resistance. Rotorcraft fuel system 170 includes fuel tank 28 consisting of forward bags 100, 102, feed bags 104, 106, mid bag 108 and aft bag 110. Restraint assembly 172 is disposed about fuel tank 28 including upper and lower aft fuel bag perimeter straps 132, 134, upper and lower mid fuel bag perimeter straps 136, 138, forward and feed fuel bag perimeter strap 140, feed fuel bag surrounding strap 142, forward fuel bag surrounding straps 144, 146, and end cap straps 148, 150, 152, 154. Upper aft fuel bag perimeter strap 132 is coupled to upper mid fuel bag perimeter strap 136 at one or more connections 174, lower aft fuel bag perimeter strap 134 is coupled to lower mid fuel bag perimeter strap 138 at one or more connections 176 and lower mid fuel bag perimeter strap 138 is coupled to forward and feed fuel bag perimeter strap 140 at one or more connections 178.

As illustrated, feed fuel bag surrounding strap 142 includes a plurality of energy absorbing members depicted as stitch-rip elements 250, 252, two of which are visible in FIG. 10. Likewise, forward fuel bag surrounding strap 146 includes a plurality of energy absorbing members depicted as stitch-rip elements 254, 256, two of which are visible in FIG. 10. Adding energy absorbing members to the various straps within restraint assembly 172 allows for enhanced control of the energy flow during crash impacts to maintain other element below failure thresholds thus acting as a load limiter on critical components such as fuel bags, straps or elements of the fuel tank receiving assembly. In addition, use of energy absorbing members such as the illustrated stitch-rip elements helps to control the directionality of the energy flow, which is depicted as opening the stitch-rip elements in the lateral direction of fuel tank 28 in FIG. 10. Even though a particular type of energy absorbing member has been depicted and described with reference to FIG. 10, it should be understood by those skilled in the art that other types of energy absorbing members could alternatively be used in association with a restraint assembly disposed about a fuel tank including, for example, energy attenuating wire rollers or other suitable energy attenuating mechanical elements. Importantly, restraint assembly 172 has provided the required support about fuel tank 28 to prevent excessive motion of the fuel bags, to prevent extension and/or rupture of the fluid interconnection lines and to prevent the fuel bag from becoming punctured, thereby preventing the fuel bags from leaking fluid during and following a crash impact, which minimizes post-crash conflagration risk.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A rotorcraft fuel system comprising:
a fuel tank including a plurality of interconnected fuel bags operable to contain liquid fuel, the plurality of interconnected fuel bags including first and second forward bags, first and second feed bags, a mid bag and an aft bag, the feed bags disposed between the forward bags and the mid bag, the mid bag disposed between the feed bags and the aft bag, adjacent bags interconnected by at least one fluid interconnection line operable to communicate a fluid therebetween; and
a network of straps disposed about the fuel tank forming a restraint assembly configured to provide enhanced crash resistance, the network of straps including a first perimeter strap extending continuously around the forward bags and the feed bags, a second perimeter strap extending continuously around the mid bag, a third perimeter strap extending continuously around the aft bag, a first surrounding strap extending continuously around the forward bags and a second surrounding strap extending continuously around feed bags;
wherein, the first perimeter strap and the first surrounding strap have at least two intersections;
wherein, the first perimeter strap and the second surrounding strap have at least two intersections;
wherein, the first and second perimeter straps have at least one connection therebetween; and
wherein, the second and third perimeter straps have at least one connection therebetween.

2. The rotorcraft fuel system as recited in claim 1 wherein the at least one connection between the first and second perimeter straps further comprises at least two connections at adjacent corner sections of the first and second perimeter straps and wherein the at least one connection between the second and third perimeter straps further comprises at least two connections at adjacent corner sections of the second and third perimeter straps.

3. The rotorcraft fuel system as recited in claim 1 wherein the at least connection between the first and second perimeter straps and the at least one connection between the second and third perimeter straps further comprise connections selected from the group consisting of hook and loop connections, stitching connections and bracket member connections.

4. The rotorcraft fuel system as recited in claim 1 wherein the first and second surrounding straps extend in a lateral direction of the fuel tank.

5. The rotorcraft fuel system as recited in claim 1 further comprising a third surrounding strap extending continuously around the first forward and the first fed bags and a fourth surrounding strap extending continuously around the second forward and the second fed bags.

6. The rotorcraft fuel system as recited in claim 1 wherein the first perimeter strap and the first and second surrounding straps move independent of each other at the intersections thereof.

7. The rotorcraft fuel system as recited in claim 1 wherein the at first perimeter strap and the first and second surrounding straps are coupled to each other at the intersections thereof.

8. The rotorcraft fuel system as recited in claim 1 wherein the network of straps moves independent of the fuel bags.

9. The rotorcraft fuel system as recited in claim 1 wherein the network of straps is selectively coupled to the fuel bags.

10. The rotorcraft fuel system as recited in claim 1 wherein the network of straps further comprises first and second end cap straps coupled to upper and lower sections of the first surrounding strap and extending therebetween around respective end portions of the first and second forward bags.

11. The rotorcraft fuel system as recited in claim 10 further comprises third and fourth end cap straps coupled to the upper and lower sections of the first surrounding strap and extending therebetween around respective end portions of the first and second forward bags.

12. The rotorcraft fuel system as recited in claim 1 further comprising a third perimeter strap extending continuously around the mid bag.

13. The rotorcraft fuel system as recited in claim 12 further comprising a fourth perimeter strap extending continuously around the aft bag.

14. The rotorcraft fuel system as recited in claim 1 wherein respective first and second ends of the first, second and third perimeter straps are coupled together.

15. The rotorcraft fuel system as recited in claim 1 wherein respective first and second ends of the first and second surrounding straps are coupled together.

16. The rotorcraft fuel system as recited in claim 1 wherein the network of straps further comprises energy absorbing elements.

17. A rotorcraft comprising:
a fuselage having a fuel tank receiving assembly;
a fuel tank positioned in the fuel tank receiving assembly, the fuel tank including a plurality of interconnected fuel bags operable to contain liquid fuel, the plurality of interconnected fuel bags including first and second forward bags, first and second feed bags, a mid bag and an aft bag, the feed bags disposed between the forward bags and the mid bag, the mid bag disposed between the feed bags and the aft bag, adjacent bags interconnected by at least one fluid interconnection line operable to communicate a fluid therebetween; and
a network of straps disposed about the fuel tank forming a restraint assembly configured to provide enhanced crash resistance, the network of straps including a first perimeter strap extending continuously around the forward bags and the feed bags, a second perimeter strap extending continuously around the mid bag, a third perimeter strap extending continuously around the aft bag, a first surrounding strap extending continuously around the forward bags and a second surrounding strap extending continuously around feed bags;
wherein, the first perimeter strap and the first surrounding strap have at least two intersections;
wherein, the first perimeter strap and the second surrounding strap have at least two intersections;
wherein, the first and second perimeter straps have at least one connection therebetween; and
wherein, the second and third perimeter straps have at least one connection therebetween.

* * * * *

UNITED STATES PATENT AND TRADEMARK OFFICE
CERTIFICATE OF CORRECTION

PATENT NO. : 10,196,151 B2
APPLICATION NO. : 15/144179
DATED : February 5, 2019
INVENTOR(S) : Martin Peryea et al.

Page 1 of 1

It is certified that error appears in the above-identified patent and that said Letters Patent is hereby corrected as shown below:

In the Claims

Column 10, Line 54:
"the at least connection between the first and second perim-" should read --the at least one connection between the first and second perim- --

Signed and Sealed this
Nineteenth Day of March, 2019

Andrei Iancu
*Director of the United States Patent and Trademark Office*